US012626249B1

(12) United States Patent
Nema

(10) Patent No.: US 12,626,249 B1
(45) Date of Patent: *May 12, 2026

(54) SYSTEM AND METHOD FOR ENFORCING PII SEGREGATION IN A DISTRIBUTED DATA PROCESSING SYSTEM FOR PRIVACY-PRESERVING AI CORPUS GENERATION

(71) Applicant: Waleed S Nema, Garland, TX (US)

(72) Inventor: Waleed S Nema, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/334,453

(22) Filed: Sep. 19, 2025

Related U.S. Application Data

(63) Continuation-in-part of application No. 19/315,444, filed on Aug. 29, 2025, now Pat. No. 12,556,907.

(60) Provisional application No. 63/723,691, filed on Nov. 22, 2024.

(51) Int. Cl.
| | |
|---|---|
| *G06Q 20/38* | (2012.01) |
| *G06N 20/00* | (2019.01) |
| *G06Q 20/40* | (2012.01) |

(52) U.S. Cl.
CPC ......... *G06Q 20/3825* (2013.01); *G06N 20/00* (2019.01); *G06Q 20/3829* (2013.01); *G06Q 20/401* (2013.01)

(58) Field of Classification Search
CPC ........... G06Q 20/3825; G06Q 20/3829; G06Q 20/401; G06N 20/00
See application file for complete search history.

(56) References Cited

U.S. PATENT DOCUMENTS

| | | | | | |
|---|---|---|---|---|---|
| 6,871,276 | B1 * | 3/2005 | Simon | ................... | H04L 9/3257 |
| | | | | | 713/180 |
| 7,062,658 | B1 * | 6/2006 | Cheriton | ............ | H04N 21/4623 |
| | | | | | 713/193 |
| 8,165,301 | B1 * | 4/2012 | Bruce | ................... | H04L 9/0894 |
| | | | | | 713/189 |
| 8,868,923 | B1 * | 10/2014 | Hamlet | ................... | G06F 21/00 |
| | | | | | 326/8 |
| 9,058,603 | B1 * | 6/2015 | Lee | ................... | G06Q 20/3823 |
| 9,159,063 | B1 * | 10/2015 | McDonald | ........... | G06Q 20/382 |
| 10,003,584 | B1 * | 6/2018 | Roth | .................... | H04L 63/068 |
| 10,162,967 | B1 * | 12/2018 | Oliver | ................... | H04L 63/145 |

(Continued)

*Primary Examiner* — Aravind K Moorthy

(57) ABSTRACT

A system and method are disclosed for generating a privacy-preserving data corpus for Artificial Intelligence (AI) training. The system comprises a relying partner (RP) computing environment and a trusted, independent identity provider (IdP) computing system. Upon a user authentication request, the IdP provides the RP with only a PII-free, persistent pseudonymous identifier (gUserID) for the user. Any authentication artifacts containing Personally Identifiable Information (PII), such as an OAuth token, are programmatically neutralized by the IdP. This is achieved by generating a transient public-private encryption key pair, immediately destroying the private key, and encrypting the PII-laden artifact with the remaining public key, rendering the PII therein permanently irrecoverable. This enforcement of "PII unknowability" at the RP enables the aggregation of pseudonymous user data, linked by the persistent gUserID, from multiple independent RPs into a rich, cross-organizational corpus for AI training, without ever exposing user PII to the RP.

44 Claims, 15 Drawing Sheets

Core System Architecture for PII Segregation

(56) References Cited

U.S. PATENT DOCUMENTS

| | | | | |
|---|---|---|---|---|
| 10,594,034 | B1* | 3/2020 | Tran | H01Q 1/04 |
| 10,839,378 | B1* | 11/2020 | Srinivasan | G06Q 20/401 |
| 10,867,073 | B1* | 12/2020 | Yang | G06F 21/6245 |
| 11,121,883 | B1* | 9/2021 | Webber | H04L 63/0263 |
| 11,164,165 | B1* | 11/2021 | Andreev | G06Q 20/02 |
| 11,258,617 | B1* | 2/2022 | Peddada | H04L 9/0838 |
| 11,301,586 | B1* | 4/2022 | Poh | G06F 21/6254 |
| 11,323,477 | B1* | 5/2022 | Kumar | H04L 63/168 |
| 11,449,799 | B1* | 9/2022 | Arbajian | H04L 9/3013 |
| 11,451,378 | B2* | 9/2022 | Baratte | H04L 9/0825 |
| 11,531,846 | B1* | 12/2022 | Bodapati | G06N 20/00 |
| 11,562,363 | B2* | 1/2023 | Govindarajan | G06Q 20/40145 |
| 11,582,240 | B1* | 2/2023 | Bhatt | G06F 21/6245 |
| 11,711,216 | B1* | 7/2023 | Poh | G06F 21/32 |
| | | | | 713/186 |
| 11,855,849 | B1* | 12/2023 | Davis | G06N 5/025 |
| 12,035,136 | B1* | 7/2024 | Shahidzadeh | H04L 63/1425 |
| 12,062,368 | B1* | 8/2024 | Arora | G06N 20/00 |
| 12,126,713 | B1* | 10/2024 | Ramanathan | H04L 9/0861 |
| 12,132,827 | B1* | 10/2024 | Khalsa | H04L 9/0838 |
| 12,212,681 | B1* | 1/2025 | Drapeau | G06Q 20/085 |
| 12,217,243 | B1* | 2/2025 | Dinan | G06Q 20/385 |
| 12,223,259 | B1* | 2/2025 | Sembium Varadarajan | |
| | | | | G06F 21/6254 |
| 12,277,511 | B2* | 4/2025 | Ablitt | G06N 5/022 |
| 12,556,907 | B1* | 2/2026 | Nema | H04W 12/02 |
| 2005/0187873 | A1* | 8/2005 | Labrou | G06Q 20/326 |
| | | | | 705/40 |
| 2006/0020811 | A1* | 1/2006 | Tan | H04L 63/126 |
| | | | | 713/180 |
| 2007/0081667 | A1* | 4/2007 | Hwang | H04L 9/3271 |
| | | | | 380/30 |
| 2007/0226507 | A1* | 9/2007 | Schilling | G06F 21/645 |
| | | | | 713/176 |
| 2008/0016357 | A1* | 1/2008 | Suarez | H04L 63/0823 |
| | | | | 713/176 |
| 2008/0263271 | A1* | 10/2008 | Kishi | G06F 3/0652 |
| | | | | 711/111 |
| 2008/0306875 | A1* | 12/2008 | Mardikar | H04L 63/061 |
| | | | | 705/71 |
| 2009/0049310 | A1* | 2/2009 | Carlson | G11B 20/00666 |
| | | | | 711/111 |
| 2011/0154025 | A1* | 6/2011 | Spalka | H04L 9/3236 |
| | | | | 713/182 |
| 2011/0268269 | A1* | 11/2011 | Spalka | H04L 9/0866 |
| | | | | 380/44 |
| 2013/0132718 | A1* | 5/2013 | Agrawal | H04L 9/3268 |
| | | | | 713/178 |
| 2015/0310431 | A1* | 10/2015 | Lakshmanan | G06Q 20/3823 |
| | | | | 705/71 |
| 2016/0048670 | A1* | 2/2016 | Kim | G06V 40/1353 |
| | | | | 382/125 |
| 2016/0072808 | A1* | 3/2016 | David | H04L 63/126 |
| | | | | 713/158 |
| 2016/0192194 | A1* | 6/2016 | Yang | H04W 12/082 |
| | | | | 713/171 |
| 2016/0275461 | A1* | 9/2016 | Sprague | G06Q 20/3829 |
| 2017/0154314 | A1* | 6/2017 | Mones | G06Q 10/1053 |
| 2017/0337588 | A1* | 11/2017 | Chittilappilly | G06Q 30/0244 |
| 2017/0352034 | A1* | 12/2017 | Yu | G06Q 20/0855 |
| 2017/0372087 | A1* | 12/2017 | Lee | H04L 9/0863 |
| 2018/0025151 | A1* | 1/2018 | Ekberg | H04L 9/3271 |
| | | | | 713/176 |
| 2018/0183590 | A1* | 6/2018 | Kuo | H04L 9/0838 |
| 2018/0255068 | A1* | 9/2018 | Figueroa | H04L 67/563 |
| 2018/0276663 | A1* | 9/2018 | Arora | G06K 7/1417 |
| 2018/0285863 | A1* | 10/2018 | Loh | G06Q 20/0655 |
| 2018/0336553 | A1* | 11/2018 | Brudnicki | G06Q 20/385 |
| 2019/0123911 | A1* | 4/2019 | Riley | H04L 9/3234 |
| 2019/0213821 | A1* | 7/2019 | Davis | H04L 9/3239 |
| 2019/0215164 | A1* | 7/2019 | Hamann | H04L 9/0894 |
| 2019/0227718 | A1* | 7/2019 | Frolikov | G06F 21/80 |
| 2019/0229896 | A1* | 7/2019 | Charters | H04L 9/3247 |
| 2019/0349347 | A1* | 11/2019 | Curtis | H04L 63/0876 |
| 2019/0374292 | A1* | 12/2019 | Barral | B25J 9/1682 |
| 2020/0067699 | A1* | 2/2020 | Resch | G09C 1/00 |
| 2020/0067861 | A1* | 2/2020 | Leddy | G06F 21/6245 |
| 2020/0137058 | A1* | 4/2020 | Allen | H04L 63/0815 |
| 2020/0195446 | A1* | 6/2020 | Lepoint | H04L 63/0435 |
| 2020/0204527 | A1* | 6/2020 | Vass | H04L 63/0428 |
| 2020/0213112 | A1* | 7/2020 | Singleton, IV | G06F 8/61 |
| 2020/0213311 | A1* | 7/2020 | Saha | H04L 9/3268 |
| 2020/0233977 | A1* | 7/2020 | Chickerur | G06F 21/6254 |
| 2020/0242711 | A1* | 7/2020 | Cao | H04L 9/0894 |
| 2020/0250633 | A1* | 8/2020 | Vinson | G06Q 20/3676 |
| 2020/0272753 | A1* | 8/2020 | Goldberg | G06N 20/00 |
| 2020/0286047 | A1* | 9/2020 | Joveski | G06Q 20/065 |
| 2020/0304503 | A1* | 9/2020 | Zerrad | H04L 63/10 |
| 2020/0387633 | A1* | 12/2020 | Kapinos | G06F 21/6245 |
| 2021/0035140 | A1* | 2/2021 | Fuzayloff | G06F 40/40 |
| 2021/0049588 | A1* | 2/2021 | Kamal | H04L 9/3231 |
| 2021/0065070 | A1* | 3/2021 | Augustine | G06Q 50/01 |
| 2021/0105139 | A1* | 4/2021 | Choi | H04L 9/3231 |
| 2021/0157710 | A1* | 5/2021 | Alexander | G06F 11/3476 |
| 2021/0158805 | A1* | 5/2021 | Sivasubramanian | |
| | | | | G06F 40/279 |
| 2021/0176054 | A1* | 6/2021 | Zabar | H04L 9/0894 |
| 2021/0182423 | A1* | 6/2021 | Padmanabhan | H04L 9/3271 |
| 2021/0314342 | A1* | 10/2021 | Oberg | H04L 63/20 |
| 2021/0377735 | A1* | 12/2021 | Latour | H04W 12/069 |
| 2021/0390447 | A1* | 12/2021 | Cheruvu | G06N 20/00 |
| 2021/0399878 | A1* | 12/2021 | Araki | H04L 9/0894 |
| 2022/0021542 | A1* | 1/2022 | Franklin | H04L 9/30 |
| 2022/0029790 | A1* | 1/2022 | Peddada | H04L 9/0891 |
| 2022/0036356 | A1* | 2/2022 | Praszczalek | G06F 21/45 |
| 2022/0138640 | A1* | 5/2022 | Augustine | H04L 67/535 |
| | | | | 705/5 |
| 2022/0207163 | A1* | 6/2022 | Gentleman | G06F 21/62 |
| 2022/0209955 | A1* | 6/2022 | Tzur-David | H04L 63/061 |
| 2022/0210140 | A1* | 6/2022 | Dhunay | G06N 20/00 |
| 2022/0247554 | A1* | 8/2022 | Peddada | H04L 9/0897 |
| 2022/0319258 | A1* | 10/2022 | Kloepfer | F41A 17/066 |
| 2023/0153807 | A1* | 5/2023 | Ma | G06Q 20/3674 |
| | | | | 705/39 |
| 2023/0168986 | A1* | 6/2023 | Larkin | G06N 20/00 |
| | | | | 717/127 |
| 2023/0252324 | A1* | 8/2023 | Matlick | H04L 61/5007 |
| | | | | 706/12 |
| 2023/0401564 | A1* | 12/2023 | Barrett | G06Q 20/3829 |
| 2024/0112177 | A1* | 4/2024 | Maier | G06Q 40/00 |
| 2024/0113728 | A1* | 4/2024 | Cooper | G06N 20/00 |
| 2024/0113879 | A1* | 4/2024 | Luna | G06F 16/9554 |
| 2024/0129110 | A1* | 4/2024 | Lu | G06F 21/121 |
| 2024/0134988 | A1* | 4/2024 | Veluthakkal | G06F 21/575 |
| 2024/0242555 | A1* | 7/2024 | Jarvis | G06Q 20/3825 |
| 2024/0249201 | A1* | 7/2024 | Muller | G06F 18/2193 |
| 2024/0303172 | A1* | 9/2024 | Larkin | G06F 11/3072 |
| 2024/0311696 | A1* | 9/2024 | Mukhopadhyay | G06Q 20/14 |
| 2024/0311823 | A1* | 9/2024 | Wilson | G06F 21/10 |
| 2024/0406001 | A1* | 12/2024 | Wesselkamper | H04L 9/3242 |
| 2024/0428256 | A1* | 12/2024 | Seibert, Jr. | G06Q 40/125 |
| 2025/0021691 | A1* | 1/2025 | Davydov | G16H 10/60 |
| 2025/0104542 | A1* | 3/2025 | Soltan | G08B 5/22 |
| 2025/0131454 | A1* | 4/2025 | Sharieh | G06N 20/20 |
| 2025/0141682 | A1* | 5/2025 | Hutchinson | G06F 21/32 |
| 2025/0156558 | A1* | 5/2025 | Schmitt | G06F 21/602 |
| 2025/0173711 | A1* | 5/2025 | Siegel | H04L 9/3247 |
| 2025/0233739 | A1* | 7/2025 | Courtois | H04L 9/3247 |
| 2025/0330836 | A1* | 10/2025 | Tran | H04W 16/32 |
| 2025/0348779 | A1* | 11/2025 | Ballinger | G06N 20/00 |

* cited by examiner

Core System Architecture for PII Segregation

System Overview

Core System Architecture for Passwordless PII Segregation

Cross-Organizational Data Corpus Ecosystem

User Registration and Pseudonymous ID Generation

Payment Processing with Pseudonymous Transaction Codes

PII Minimization and Neutralization Flow within the IdP

Privacy-Preserving Incentive Payment Flow

Incentive Payment Method Flow Details

User Opt-In to Cross-Organizational Data Corpora

Identity Provider Pseudo-code

```
1    class IdentityProvider {
2        // --- User Authentication and gUserID Management ---
3
4        // Main entry point for authentication requests from any RP.
5        function handle_authentication_request() {
6            // Present authentication options to the user (e.g., social login, password).
7            // This process results in a successful authentication and PII-laden artifacts.
8            pii_laden_artifact = perform_user_authentication();
9
10           if (authentication is successful) {
11               // Retrieve or create the user's persistent, pseudonymous identifier.
12               gUserID = get_or_create_gUserID(pii_laden_artifact.user_email);
13
14               // *** CORE INVENTIVE STEP: The "Killer Key" Mechanism ***
15               // Neutralize the PII-laden artifact to enforce the "PII Unknowable" rule.
16               neutralize_pii_artifact(pii_laden_artifact);
17
18               // Generate a secure, one-time authorization code for the callback.
19               auth_code = generate_one_time_code(gUserID);
20
21               // Redirect the user back to the RP with the authorization code.
22               redirect_user_to(RP.callback_url, auth_code);
23           }
24       }
25
26       // The "Killer Key" process for permanent PII neutralization.
27       function neutralize_pii_artifact(artifact) {
28           // 1. Programmatically generate a new, temporary cryptographic key pair.
29           killer_keypair = generate_key_pair();
30
31           // 2. Immediately and permanently destroy the private key of this new pair.
32           destroy(killer_keypair.private_key); // The private key is now irrecoverable.
33
34           // 3. Use the remaining, orphaned public key to encrypt the PII-laden artifact.
35           encrypted_artifact = encrypt(artifact, killer_keypair.public_key);
36
37           // The original artifact is now permanently unreadable.
38           // The encrypted_artifact can be logged for audit purposes if needed,
39           // but it can never be decrypted by anyone.
40           log("PII artifact neutralized: " + encrypted_artifact);
41       }
42
43       // Called by the RP to securely exchange the one-time code for the gUserID.
44       function exchange_auth_code_for_gUserID(auth_code) {
45           // Validate the one-time code and retrieve the associated gUserID.
46           gUserID = database.find_gUserID_by_auth_code(auth_code);
47
48           // Invalidate the code after use.
49           database.invalidate_auth_code(auth_code);
50
51           // Return ONLY the gUserID to the RP.
52           return gUserID;
53       }
54   }
```

FIG. 12

Relying Partner Pseudo-code

```
1   class RelyingPartner {
2       // RP's key pair for decrypting payment confirmations.
3       // The public key (rp_payment_public_key) is shared with the PP during setup.
4       rp_payment_keypair = generate_key_pair();
5       // --- User Authentication Flows ---
6       // Called when a new user clicks "Register".
7
8       function handle_registration_request(user_request) {
9           // Redirect the user's browser to the IdP's authentication endpoint.
10          redirect_user_to(IdP.authentication_url);
11      }
12
13      // Called when an existing user clicks "Login".
14      function handle_login_request(user_request) {
15          // The process is identical to registration from the RP's perspective.
16          redirect_user_to(IdP.authentication_url);
17      }
18
19      // Called when the user is redirected back from the IdP after authentication.
20      function handle_idp_callback(auth_code) {
21          // Exchange the one-time authorization code for the persistent gUserID.
22          gUserID = IdP.exchange_auth_code_for_gUserID(auth_code);
23          // Check if the gUserID is valid.
24          if (gUserID is not null) {
25              // Look up the user in the local database.
26              user_account = database.find_user_by_gUserID(gUserID);
27
28              if (user_account is null) {
29                  // If the user does not exist, create a new local account.
30                  database.create_user(gUserID);
31              }
32              // Establish a new session for the user, identified only by gUserID.
33              session.create(gUserID);
34              return "Login/Registration Successful";
35          } else {
36              return "Authentication Failed";
37          }
38      }
39      // --- Payment Flow ---
40      // Called when a logged-in user clicks "Make Payment".
41      function handle_payment_request(user_session) {
42          // The user is identified by the gUserID stored in their session.
43          gUserID = user_session.get_gUserID();
44          // Redirect the user to the PP. Note: No PII or gUserID is sent to the PP.
45          redirect_user_to(PP.payment_url);
46      }
47
48      // Called when the user is redirected back from the PP after a payment attempt.
49      function handle_payment_callback(encrypted_tx_code) {
50          // Decrypt the transaction code using the RP's private key.
51          tx_code = decrypt(encrypted_tx_code, rp_payment_keypair.private_key);
52          if (tx_code is valid) {
53              // Retrieve the gUserID from the current user's session.
54              gUserID = session.get_gUserID();
55
56              //Link the successful payment to the user's account and fulfill the order.
57              database.record_payment(gUserID, tx_code);
58              fulfill_order(gUserID);
59              return "Payment Successful";
60          } else {
61              return "Payment Failed";
62          }
63      }
64  }
```

FIG. 13

Payment Processor Pseudo-code: 1/2

```
1    // Payment Processor (PP) Pseudo-code
2    // Environment: Financial PII, No gUserID
3    // The PP is the only entity that handles raw financial PII.
4    // It is architecturally blind to the gUserID.
5
6    class PaymentProcessor {
7        // Securely stores mapping of {PayeeId -> FinancialPII}
8        private payeeDatabase;
9
10       // Securely stores mapping of {PayorTxCode -> TransactionDetails}
11       private transactionDatabase;
12
13       // The RP's public key for encrypting transaction codes
14       private rpPublicKey;
15
16       constructor(rpPublicKey) {
17           this.payeeDatabase = new SecureDatabase();
18           this.transactionDatabase = new SecureDatabase();
19           this.rpPublicKey = rpPublicKey;
20       }
21
22       // =====================================================================
23       // PAYOR FUNCTIONALITY: Processing a payment FROM a user to an RP
24       // Corresponds to FIG. 500
25       // =====================================================================
26       function handlePaymentRequest(paymentDetails, userFinancialPII) {
27           // 1. Validate the user's financial PII (e.g., credit card, bank account)
28           if (!this.verifyFinancialPII(userFinancialPII)) {
29               return { success: false, error: "Invalid financial details." };
30           }
31
32           // 2. Process the payment with a financial institution
33           let processingResult = processFinancialTransaction(
34               paymentDetails.amount, userFinancialPII);
35
36           if (processingResult.isSuccessful) {
37               // 3. Generate a unique, non-PII transaction code
38               let payorTxCode = generateUniqueToken("TXN_");
39               this.transactionDatabase.save(payorTxCode, {
40                   amount: paymentDetails.amount,
41                   timestamp: now(),
42                   status: "Completed"
43               });
44
45               // 4. Encrypt the transaction code with the RP's public key
46               let encryptedTxCode = encrypt(payorTxCode, this.rpPublicKey);
47
48               // 5. Return ONLY the encrypted transaction code
49               return { success: true, encryptedPayorTxCode: encryptedTxCode };
50           } else {
51               return { success: false, error: "Payment processing failed." };
52           }
53       }
```

FIG. 14A

Payment Processor Pseudo-code 2/2

```
1    // =================================================================
2    // PAYEE FUNCTIONALITY (NEW): Setting up a user to RECEIVE payments
3    // Corresponds to FIG. 7BB
4    // =================================================================
5    function createPayee(userFinancialPII) {
6        // 1. Validate the user's financial PII for receiving payments (e.g., bank acct)
7        if (!this.verifyFinancialPII(userFinancialPII)) {
8            return { success: false, error: "Invalid financial details for payout." };
9        }
10
11       // 2. Generate a unique, secure, non-PII payment token (PayeeId)
12       let payeeId = generateUniqueToken("PAYEE_");
13
14       // 3.Securely store the mapping between the PayeeId and the user's financial PII
15       //CRITICAL:The raw financial PII is ONLY stored here, within the PP's secure env.
16       this.payeeDatabase.save(payeeId, userFinancialPII);
17
18       // 4. Return ONLY the non-PII PayeeId token to the calling system (the IdP)
19       return { success: true, payeeId: payeeId };
20   }
21
22   // =================================================================
23   // PAYEE FUNCTIONALITY: Executing an incentive payment TO a user
24   // Corresponds to FIG. 7BBA
25   // =================================================================
26   function executeIncentivePayment(payeeId, amount) {
27       // 1. Look up the user's financial PII using the provided PayeeId
28       let userFinancialPII = this.payeeDatabase.find(payeeId);
29
30       if (!userFinancialPII) {
31           return { success: false, error: "Payee not found." };
32       }
33
34       // 2. Execute the payout to the user's financial account
35       let payoutResult = processPayoutTransaction(amount, userFinancialPII);
36
37       if (payoutResult.isSuccessful) {
38           return { success: true, transactionId: payoutResult.id };
39       } else {
40           return { success: false, error: "Payout failed." };
41       }
42   }
43
44   // --- Helper functions ---
45   private function verifyFinancialPII(pii) {
46       /* ... logic ... */ return true;
47   }
48   private function processFinancialTransaction(amount, pii) {
49       /* ... logic ... */ return { isSuccessful: true };
50   }
51   private function processPayoutTransaction(amount, pii) {
52       /* ... logic ... */ return { isSuccessful: true, id: "PAYOUT_123" };
53   }
54   private function generateUniqueToken(prefix) {
55       /* ... logic ... */ return prefix + new UUID();
56   }
57   private function encrypt(data, publicKey) {
58       /* ... logic ... */
59       return "encrypted_" + data;
60   }
61 }
```

FIG. 14B

SYSTEM AND METHOD FOR ENFORCING PII SEGREGATION IN A DISTRIBUTED DATA PROCESSING SYSTEM FOR PRIVACY-PRESERVING AI CORPUS GENERATION

CROSS-REFERENCE TO RELATED APPLICATIONS

1. This application claims the benefit of the following two provisional patent applications:
   a. Provisional Application No. 63/723,691 submitted on Nov. 22, 2024 11:11:32 AM Z ET Title: PSEUDONYMOUS USER AI CORPORA, BUSINESS MODEL AND METHODS
   b. Provisional Application No. 63/872,467 submitted on Aug. 29, 2025 10:04:49 AM Z ET Title: A System and Method for Enforcing PII Segregation in a Distributed Data 1 Processing System for Privacy-Preserving AI Corpus Generation
2. This application is a continuation-in-part of U.S. patent application Ser. No. 19/315,444, filed on Aug. 29, 2025 10:32:09 PM Z ET, the disclosure of which is incorporated herein by reference in its entirety.

FEDERALLY SPONSORED RESEARCH AND DEVELOPMENT

Not Applicable

REFERENCE TO A "SEQUENCE LISTING", A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not Applicable

REFERENCES CITED

U.S. Pat. No. 8,281,149 B2: "Private user-controlled pseudonymous access to a relying party"
U.S. Patent No. US 2022/0147654 A1: "Data anonymization"

The present invention relates generally to the field of computer data security and privacy. More specifically, it pertains to systems and methods for creating large-scale datasets for training artificial intelligence models while architecturally preventing the disclosure of personally identifiable information to the service providers collecting the data.

The advancement of digital services, particularly in areas like artificial intelligence (AI) and user personalization, is fundamentally dependent on the availability of vast and detailed datasets. AI models require massive, diverse, and often longitudinal data corpora for effective training, while personalized user experiences rely on the continuous tracking and analysis of individual user behavior over time. This dependency has created an inherent and unresolved conflict between technological utility and user privacy.

Conventional system architectures address this need by directly linking user-generated data and behavioral analytics to a user's Personally Identifiable Information (PII). A stable, PII-linked identifier (such as an email address or account name) is used as the primary key for aggregating a user's history, preferences, and interactions. While this approach enables powerful personalization and data aggregation, it comes at a severe cost to privacy. It exposes users to significant risks, including data breaches that can reveal sensitive personal information, the potential for unauthorized surveillance, and the chilling effect on user expression that comes with the knowledge of being constantly monitored and profiled.

The core of the problem lies in a fundamental architectural limitation of these conventional systems: the tight and often inseparable coupling of a persistent user identifier (which is essential for personalization) with the user's real-world identity (PII). This architecture forces users and service providers into a false dichotomy. Users must choose between surrendering their privacy to receive a rich, personalized experience or protecting their identity at the cost of receiving a generic, impersonal, and less useful service. Consequently, there exists a significant and unmet need for a new technical framework that can fundamentally decouple these two concepts-a system that can support deep, persistent user modeling for advanced personalization and data aggregation while simultaneously making the user's real-world identity technically unknowable to the service provider.

PRIOR ART

The defense of this invention's novelty and non-obviousness rests on a unique combination of technical features that, when viewed as a whole, represent a significant departure from prior art solutions. The primary arguments against the most relevant fields of art are as follows:

1. Distinction from Federated Learning (FL)
   An examiner may cite prior art related to Federated Learning, as it is a known method for privacy-preserving AI.
   a. Argument:
      While both the present invention and Federated Learning (FL) address the problem of training AI models on sensitive data, they do so through fundamentally different and mutually exclusive technical architectures.
      i. FL follows a "model-to-the-data" approach. In FL, a global model is sent out to be trained on decentralized client devices where the raw data resides. Only the model updates (e.g., gradients) are sent back to a central server; the raw data is never centralized.
      ii. The present invention follows a "data-to-the-model" approach. It creates a centralized, cross-organizational corpus of pseudonymous data, which is then used to train an AI model in a more traditional manner.
   b. Inventive Distinction:
      This architectural divergence is not an obvious design choice but a specific technical trade-off that yields a different and unexpected result. The disclosed invention's architecture allows for rich, longitudinal analysis and querying of the pseudonymous data corpus itself, a technical capability that is impossible in FL systems where only abstract model gradients are available centrally. While FL avoids creating a centralized "honeypot" of data, the present invention solves this problem through a different technical means: the "PII Unknowable" mandate enforced by the "killer key." Therefore, the invention is not an obvious alternative to FL but a distinct and inventive solution to the problem.

3

2. Distinction from Decentralized Identifiers (DIDs) and Standard Pseudonymization An examiner will cite numerous references for using pseudonyms or other privacy-enhancing identifiers. The most advanced of these, such as the W3C's Decentralized Identifiers (DIDs), will be particularly relevant.

a. Argument:

The present invention makes a specific, counterintuitive design choice that stands in direct opposition to the core privacy principle of modern identity standards like DIDs.

i. The primary goal of the DID architecture is unlinkability. DIDs achieve this by advocating for the use of pairwise-unique identifiers, where a user generates a new, distinct identifier for every single relationship to make it impossible for different relying parties to correlate user activity. The goal is to break the links.

ii. The present invention's gUserID is explicitly designed for intentional linkability. The entire technical value proposition of creating a crossorganizational AI corpus depends on using a single, persistent, global identifier across multiple, independent RPs. The goal is to preserve the links pseudonymous.

b. Inventive Distinction:

A person of ordinary skill in the art, when tasked with designing a high-privacy system, would be motivated by the teachings of the prior art (like DIDs) to maximize unlinkability. The disclosed invention's choice to sacrifice unlinkability is a non-obvious step taken to achieve a new and valuable technical outcome—the creation of a rich, linkable pseudonymous dataset. Privacy is not achieved through unlinkability, but through a novel combination of two other technical elements: the architectural PII-blindness enforced by the "killer key" mechanism, and the granular, user-controlled consent framework. This reasoned choice to move against the prevailing trend in the art is a hallmark of a non-obvious inventive step

3. Distinction from General Cross-Organizational Data Sharing and Anonymization Systems Finally, an examiner will argue that combining a known Identity Provider with known anonymization techniques to share data across organizations is an obvious combination of existing technologies.

a. Argument:

While prior art may teach elements of cross-organizational data sharing or data anonymization, no reference or combination of references teaches the specific, synergistic combination of technical constraints that define the present invention. The patentability lies not in the general idea, but in the specific implementation that makes it possible.

b. Inventive Distinction:

The key differentiator is the "killer key" mechanism. Prior art teaches anonymization techniques like hashing or suppression, which are applied to data an organization already possesses. It also teaches the use of standard encryption to secure data in transit or at rest. The "killer key" mechanism is an unconventional and non-obvious use of cryptography. It is not encryption for security (which is reversible), but encryption for destruction. The specific, automated step of programmatically generating a key pair and immediately and permanently destroying the private key as an integral part of an authentication workflow is a novel technical solution to the problem of enforcing a "PII Unknowable" state at the RP. This specific mechanism is the "inventive concept" that elevates the entire system beyond a mere combination of known elements. It is this mechanism that enables the safe use of an "intentionally linkable" identifier, a combination not taught or suggested by the prior art.

Specifically, U.S. Pat. No. 8,281,149 B2 with title "Private user-controlled pseudonymous access to a relying party" describes a system where a user can access a service (a relying party) using a pseudonym. A separate identity provider (IdP) helps create and manage this pseudonym. The main goal is to allow the user to interact with the service without revealing their true identity to that service. It focuses heavily on the authentication process and the creation of these pseudonymous credentials. While this patent establishes the general concept of using an IdP for pseudonymous access, it is fundamentally different from this disclosure in two critical ways:

1. It Lacks the "Killer Key" for Verifiable PII Destruction: The '149 patent focuses on managing pseudonyms but does not teach or suggest our specific technical mechanism for ensuring the relying party is "PII Unknowable." This invention's core novelty—the programmatic use of an orphaned public key to irreversibly neutralize any PII-laden artifacts from the authentication process—is a specific, concrete technical improvement that provides a cryptographic guarantee of PII destruction, which this prior art does not contemplate.

2. It Lacks "Intentional Linkability" for Data Corpora: The primary goal of the '149 patent is to facilitate private access to a single service. It does not teach or suggest the counter-intuitive step of using a persistent, globally unique identifier (gUserID) for the express purpose of linking a user's pseudonymous data across multiple, independent organizations to create a valuable AI data commons. This invention's focus on creating this new, privacy-preserving data ecosystem as a primary technical outcome is a key distinction. A Google's U.S. Patent No. US 2022/0147654 A1 with title "Data anonymization" describes sophisticated systems for taking datasets that contain PII and "anonymizing" them so they can be used for analysis. It discusses techniques like k-anonymity and differential privacy, where data is generalized, suppressed, or has noise added to it to prevent the re-identification of individuals. The goal is to make a dataset safe for secondary uses. This patent is about cleaning up PII after it has already been collected. However, this invention is architecturally superior and fundamentally different.

1. Architectural Prevention vs. Post-Hoc Sanitization: The '654 application describes methods for sanitizing a dataset that already contains PII. This invention, however, is an architectural solution that prevents the PII from ever reaching the relying party in the first place. The "no-PII environment" is a foundational constraint of this disclosure, not a cleanup process. This is a more secure and efficient approach.

2. No "Killer Key" Mechanism: the '654 patent uses statistical methods (like adding noise) to protect privacy. It does not teach or suggest our specific cryptographic method of using an orphaned public key to provide a verifiable, permanent guarantee of PII neutralization for authentication artifacts.

3. No User-Control, Governed Commons: The '654 application focuses on the technical act of anonymization. It does not describe the comprehensive ecosystem of this invention, which includes granular user consent for contributing to different data stores (paid vs. open) and the Fiduciary Trustee/Smart Contract governance layer to ensure fair and ethical use.

SUMMARY OF THE INVENTION

The present invention provides a technical solution to the aforementioned problems by disclosing a system, method, and data structure, referred to herein as the 'no-PII Framework'. This framework is not a business model, but a specific technical architecture that enforces the segregation of PII in a distributed data processing environment, thereby enabling the creation of valuable, privacy-preserving data corpora for AI.

The invention is built on a core architectural mandate: PII must be not only unknown but architecturally unknowable to the Relying Partner (RP) computing system. This is achieved through a system comprising at least two organizationally and technically separate entities: an RP, which provides a service to a user, and a third-party Identity Provider (IdP), which manages user authentication.

A key inventive concept is a novel cryptographic process for data neutralization, referred to as the "killer key" mechanism. In this process, the IdP programmatically generates a cryptographic key pair and then immediately and permanently destroys the private key. The remaining public key is used to encrypt any PII-laden authentication artifacts (e.g., access tokens), rendering the PII therein permanently irrecoverable.

Upon successful authentication, the IdP transmits only a persistent, PII-free, globally unique user identifier (gUserID) to the RP. This gUserID is intentionally designed to be linkable across multiple, distinct RPs, a counter-intuitive design choice that stands in contrast to prior art focused on unlinkability. This intentional linkability is what enables the primary technical outcome of the invention: the creation of a novel data structure in the form of a cross-organizational, pseudonymous data corpus.

The framework further comprises a dynamic, user-centric consent management system, allowing users to provide revocable, time-limited consent for their data contributions. It also includes a novel method for providing financial incentives to users for their data contributions in a manner that preserves the PII segregation of the architecture. Finally, the invention describes a technical governance model for the cross-organizational data corpus, structuring it as a data commons or data trust to prevent data monopolies and ensure fair, non-exclusive access.

A significant advantage of the present invention is the decoupling of user personalization from user identity. By utilizing the persistent, PII-free gUserID as the sole key for all user-generated data, the system allows the Relying Partner (RP) to build a rich, detailed, and longitudinal user profile for personalization purposes. This profile, however, is architecturally blind to the user's real-world identity, resolving the central conflict between personalization and privacy that plagues conventional systems.

No-PII Framework: A specific technical architecture that programmatically enforces the segregation of PII in a distributed data processing environment, thereby enabling the creation of valuable, privacy-preserving data corpora for applications such as artificial intelligence.

No-PII Environment (or No-PII Zone):

A computing environment, such as that of a Relying Partner, that is architecturally constrained to prevent Personally Identifiable Information (PII) from being processed or stored, rendering PII not only unknown but also technically unknowable to the entity operating the environment.

PII Minimization:

The practice of an Identity Provider (IdP) programmatically extracting and persistently storing only the minimal, stable, non-PII unique identifier from a PII-laden authentication artifact required to map a user's real-world identity to their gUserID, while neutralizing and discarding all other PII from said artifact.

gUserID:

A persistent, PII-free, globally unique user identifier, such as a Universally Unique Identifier (UUID), that serves as the sole identifier for a user within the no-PII environment and enables the linking of the user's pseudonymous data across multiple, independent Relying Partners.

Personally Identifiable Information (PII):

Any data that can be used to uniquely identify, contact, or locate an individual-either on its own or when combined with other information.

Relying Partner (RP):

An entity operating a service or application within a no-PII environment that relies on a separate, third-party Identity Provider (IdP) for user authentication and on a separate, third-party Payment Processor (PP) for all financial transactions, and receives only a gUserID as the user's identifier.

Identity Provider (IdP):

A third-party trusted service, operated by an entity legally separate from the Relying Partner, that is configured to authenticate users, perform PII minimization and neutralization, and serve as the sole bridge between a user's real-world identity and their pseudonymous gUserID within the no-PII framework.

Payment Processor (PP):

A third-party service, operated by an entity legally separate from the RP and IdP, that is architecturally constrained to handle all financial PII. The PP is blind to the gUserID and interacts with the IdP for incentive payments via a secure, non-PII payment token (PayeeId).

Killer Key:

A public key of a cryptographic key pair for which the corresponding private key is permanently and verifiably unavailable, used for the express purpose of irreversibly encrypting and neutralizing PII-laden data.

Permanently Irrecoverable:

The state of data after it has been encrypted with a Killer Key, rendering it mathematically impossible to decrypt and restore to its original form. This provides a cryptographic guarantee of destruction, which is distinct from simple data deletion that may be forensically recoverable.

BRIEF DESCRIPTION OF DRAWINGS

The following is a brief description of the drawings:

FIG. 13 Relying Partner Pseudo-code shows functions for registration, login, payments including handling callbacks with the IdP and PP.

FIG. 14A and FIG. 14B are block diagrams of the Payment Processor Pseudo-code. FIG. 14A illustrates the initizalization of a payment request from an RP session and how to handle a payor payment request. FIG. 14B illustrates how to handle incentive payments, including creating a payee, persisting a PayeeId, and executing an incentive payment.

DETAILED DESCRIPTION OF THE INVENTION

The present invention provides a system and method for enforcing the segregation of Personally Identifiable Information (PII) in a distributed data processing environment. The disclosed "no-PII framework" provides a robust technical architecture that enables the creation of rich, privacy-preserving data corpora for training artificial intelligence (AI) models while ensuring that a service provider is architecturally and programmatically prevented from accessing the PII of its users.

Figure 1:
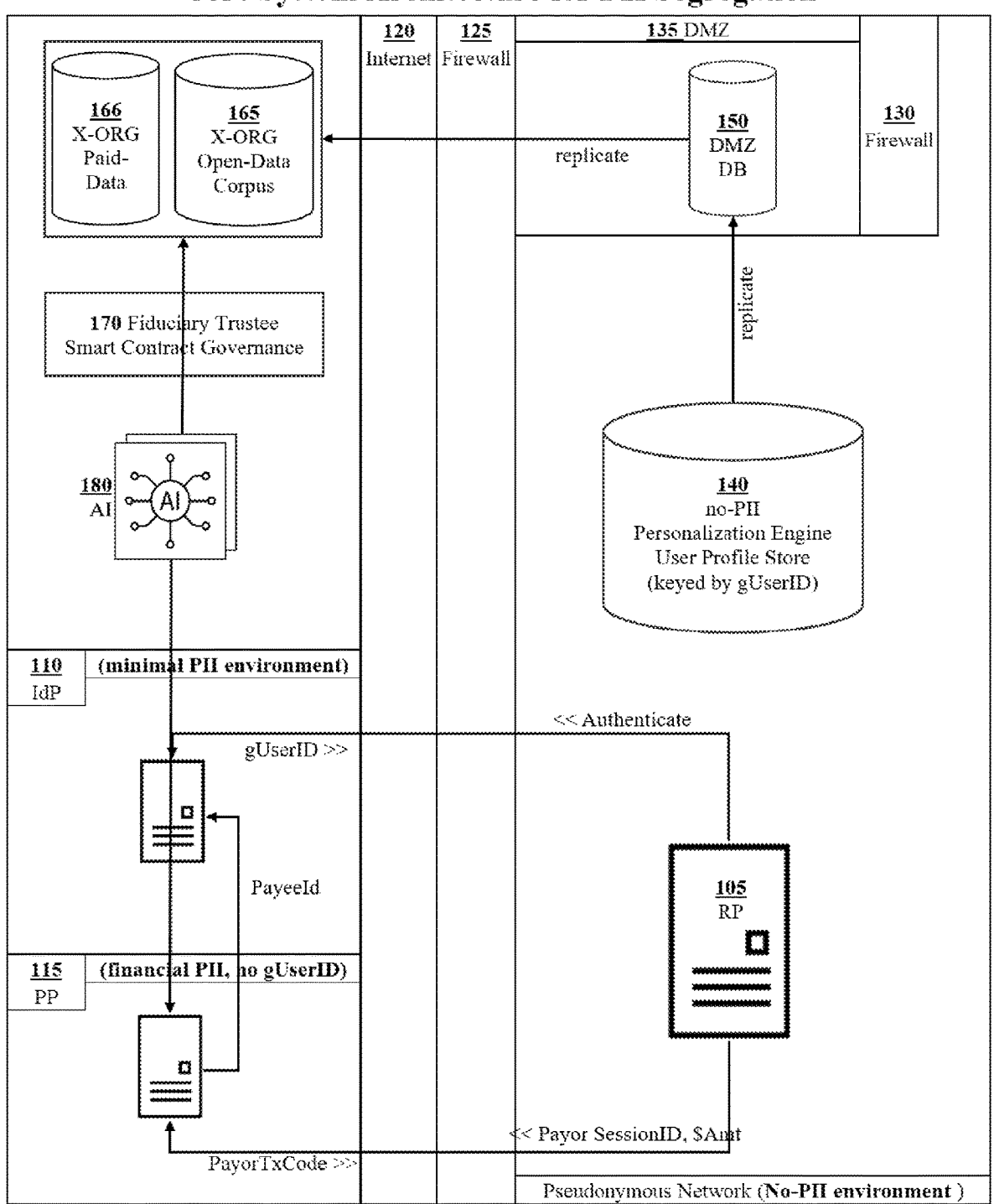
FIG. 1 is a block diagram illustrating the core system architecture of the no-PII framework, showing the segregation of roles between the key entities.
Figure 2:
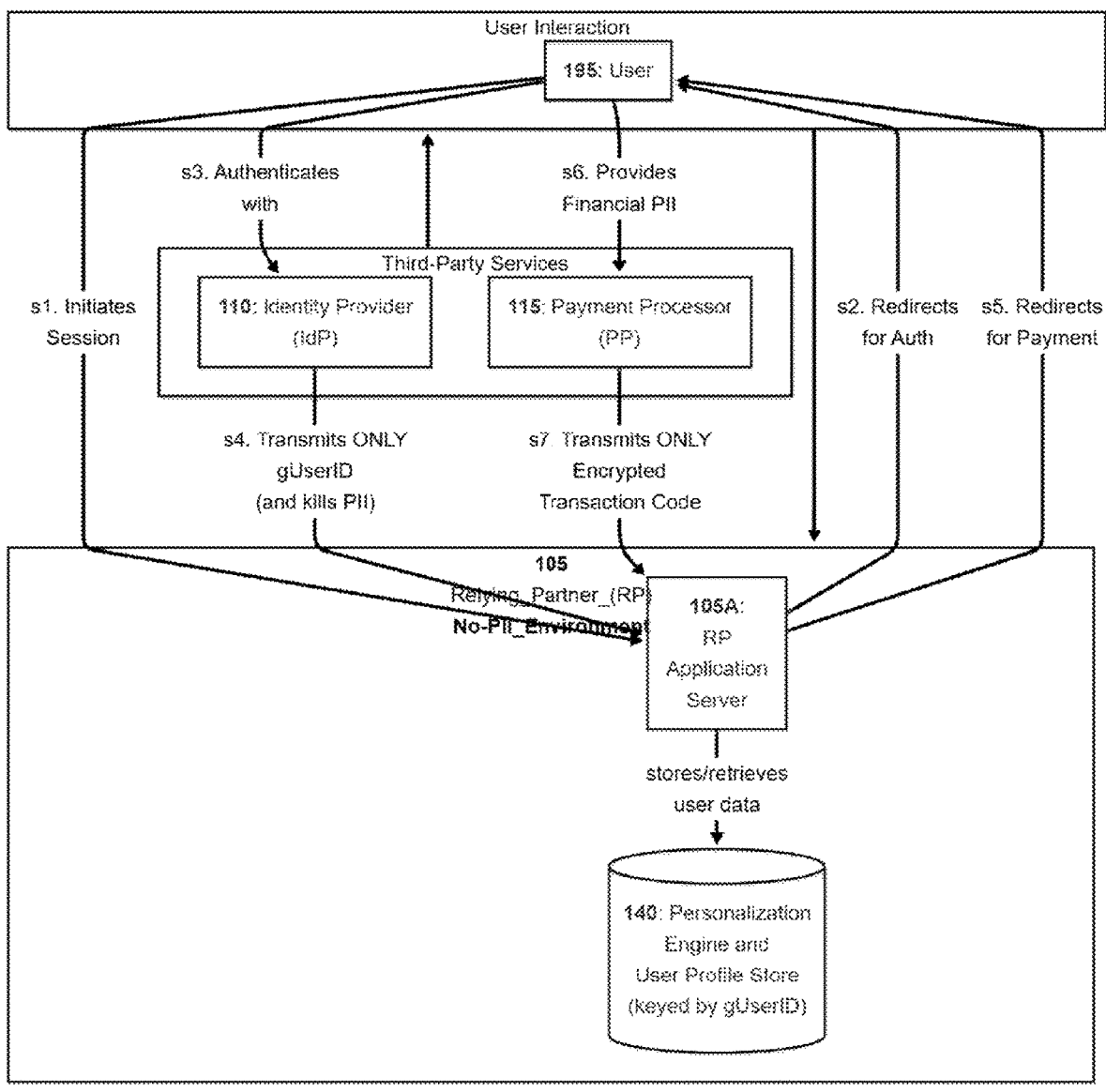
FIG. 2 shows user interaction sequences for FIG. 1.

Core System Architecture (FIG. 1 and FIG. 2)

Referring to FIG. 1, the core architecture of the system is shown, illustrating the foundational principle of segregating duties among distinct, independent entities. As recited in Claim 1, the system comprises at least a Relying Partner (RP) computing system (105), a third-party Identity Provider (IdP) computing system (110), and a third-party Payment Processor (PP) computing system (115). These entities operate in distinct security and data environments.

The RP (105) operates entirely within a Pseudonymous Network or "no-PII environment." The RP's systems, including its Personalization Engine and User Profile Store (140), are architecturally constrained to handle user data keyed only by a persistent, PII-free globally unique user identifier (gUserID). This key feature, recited in Claim 4, allows the RP to provide a deeply personalized user experience without ever knowing the user's real-world identity.

The IdP (110) operates in a "minimal PII environment." Its primary role is to authenticate the user and bridge their real-world identity to their pseudonymous gUserID. It is the only entity that can perform this mapping.

The PP (115) operates in a "financial PII, no gUserID" environment. It is the only entity that handles sensitive financial PII (e.g., bank account or credit card numbers). Crucially, the PP is architecturally blind to the gUserID that identifies the user within the RP's ecosystem.

This strict, three-way segregation of data—service data at the RP, identity data at the IdP, and financial data at the PP—is the technical foundation that makes the "no-PII framework" possible.

FIG. 100B shows a user's (195) interaction sequences with the main entities RP (105), IdP (110), and PP (115). The user (195) initiates a session with RP (105A), which redirect the user to IdP (110) for authentication, which ends in (s4) transmitting a gUserId after killing PII data. Now, a payment scenario shows request (s5) from RP (105A) already established session. The user enters financial PII on the PP (115) system, which then transmits an encrypted transaction code back to user's session at RP (105).

Figure 5:
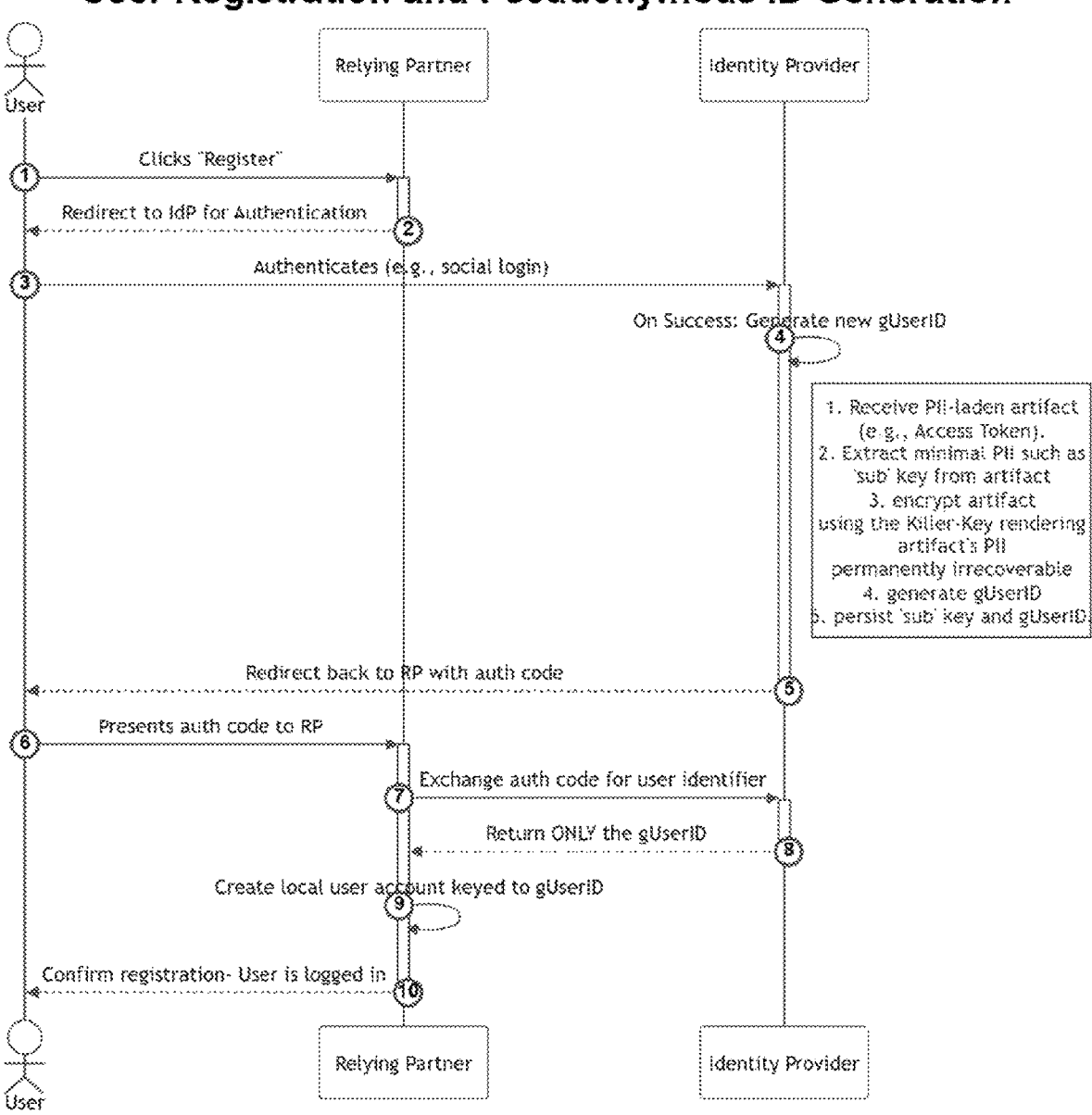
FIG. 5 is a sequence diagram illustrating the process for a new user registration and the generation of a pseudonymous gUserID.
Figure 6:
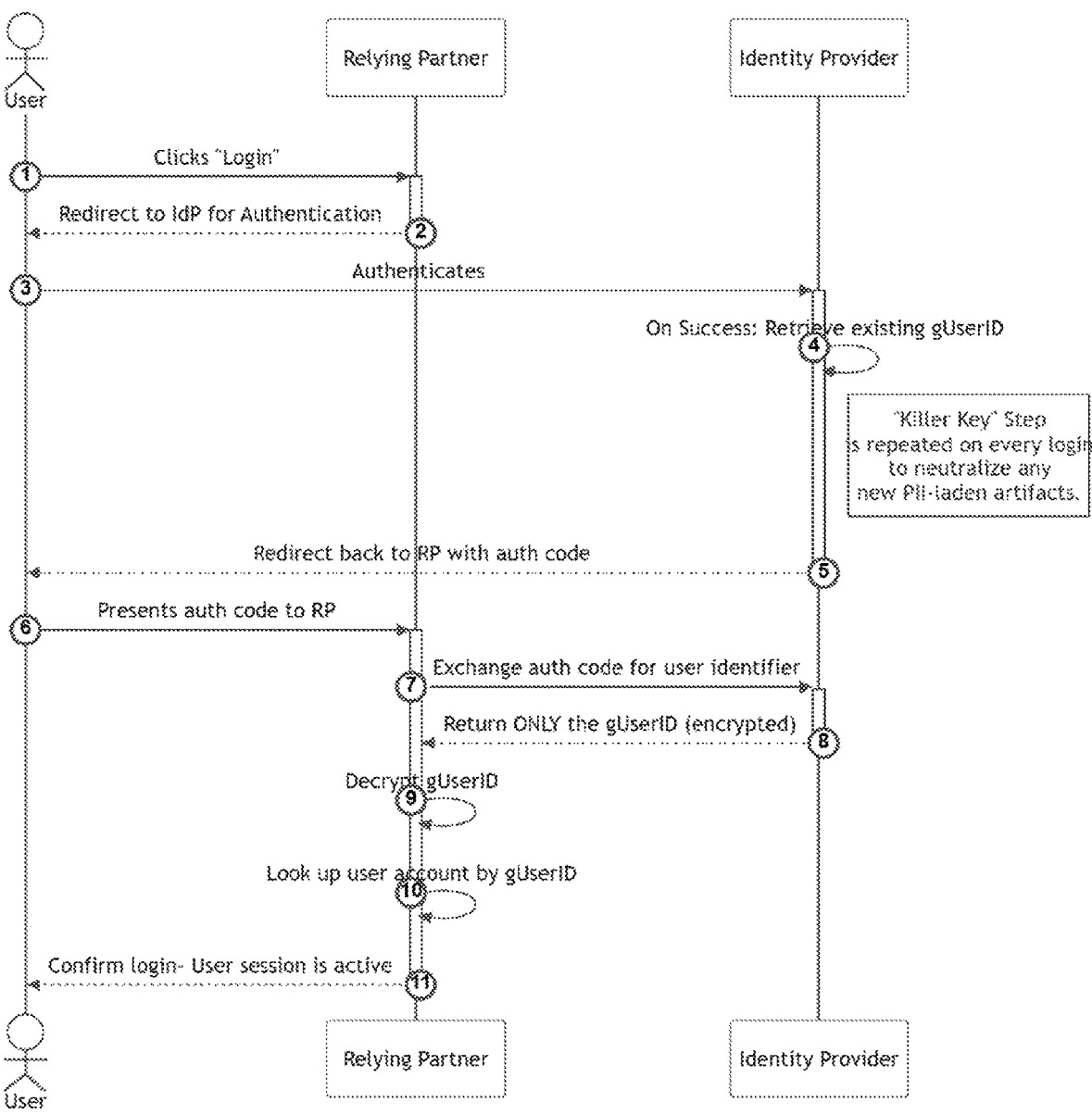
FIG. 6 is a sequence diagram illustrating the process for an existing user login and the retrieval of their pseudonymous gUserID.
Figure 8:
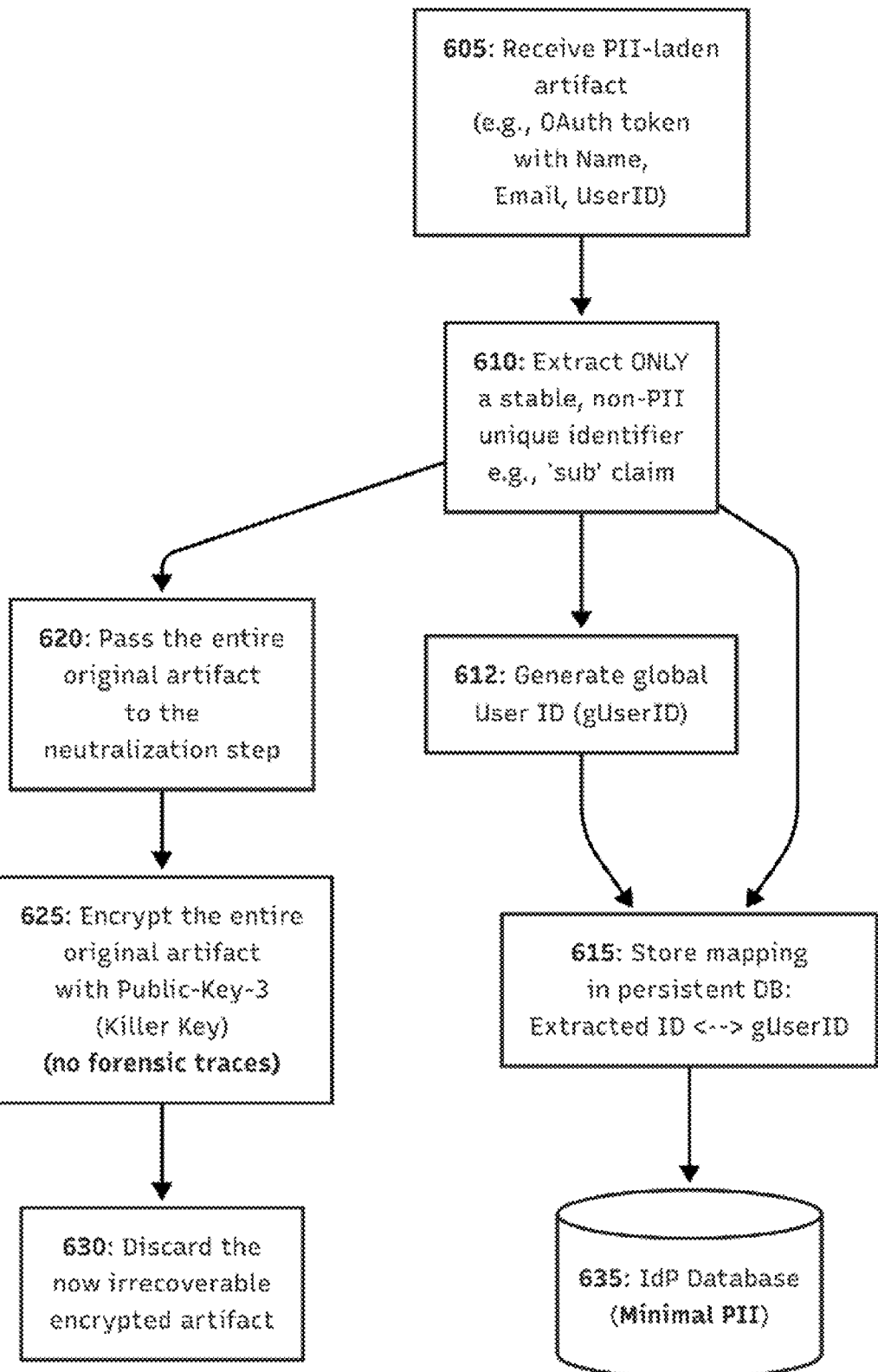
FIG. 8 is a flowchart illustrating the detailed internal process within the IdP for PII minimization and neutralization using the "killer key" mechanism.

User Authentication and PII Neutralization (FIGS. 5, 6, 8)

The process of user authentication demonstrates the core inventive mechanism for PII segregation. As shown in the new user registration flow of FIG. 5, a user begins at the RP (step 1) and is immediately redirected to the IdP for authentication (step 2). The user authenticates directly with the IdP (step 3), which then performs the critical PII neutralization and gUserID generation process.

This internal IdP process is detailed in FIG. 8. The IdP receives a PII-laden authentication artifact (605). As recited in Claim 2, the IdP's first action is a PII minimization step, extracting only a stable, non-PII unique identifier from the artifact (610). Immediately following this extraction, the process splits. Concurrently, the IdP generates a new gUserID (612) and stores the mapping between the extracted ID and the new gUserID in its persistent database (615, 635).

Simultaneously, the full, original artifact is immediately passed to the neutralization step (620). This architectural design, which processes the toxic PII artifact in parallel at the earliest possible moment, is a key aspect of the invention. It provides a fundamentally different and superior technical effect than simple data deletion, which often leaves forensically recoverable traces. The claimed neutralization method provides a cryptographic guarantee of permanent irrecoverability. This is achieved by encrypting the artifact (625) using a pre-existing public key of a first cryptographic key pair—the "killer key"—for which the corresponding private key is permanently unavailable. The resulting encrypted data is then discarded (630), having been rendered verifiably irrecoverable.

In an alternative embodiment, the orphaned public key could be obtained from a trusted third-party service (a "Key Generation Oracle") that is architecturally designed to generate key pairs and provide only the public key, never revealing or storing the private key. This achieves the same technical effect of providing a public key for which no corresponding private key is available.

Other applications of the killer-key concept include:
   "Right to be Forgotten" (GDPR/CCPA): When a user requests their data be deleted, a company can use the killer key to neutralize their PII. This creates a "cryptographic receipt of deletion," providing a much stronger and more auditable proof of compliance than simply deleting a database row.
   Secure Logging: System logs often contain sensitive PII (like IP addresses). An automated process could use the killer key to neutralize these PII fields in logs after a short retention period, preserving the log's structure for analytics while destroying the sensitive data.

Ephemeral Messaging: In a secure messaging app, once a message has been delivered and read, the server could use the killer key to neutralize the message content, providing a guarantee that it no longer exists on the server in any recoverable form.

Referring back to FIG. 5, after this neutralization, the IdP returns control to the user, who is redirected back to the RP (step 6) and presents an authorization code. The RP exchanges this code with the IdP (step 8), and the IdP transmits only the gUserID to the RP (step 9). The login flow for an existing user, shown in FIG. 6, follows the same PII neutralization process on every login to ensure no PII from any new authentication artifact is ever exposed to the RP.

Figure 7:
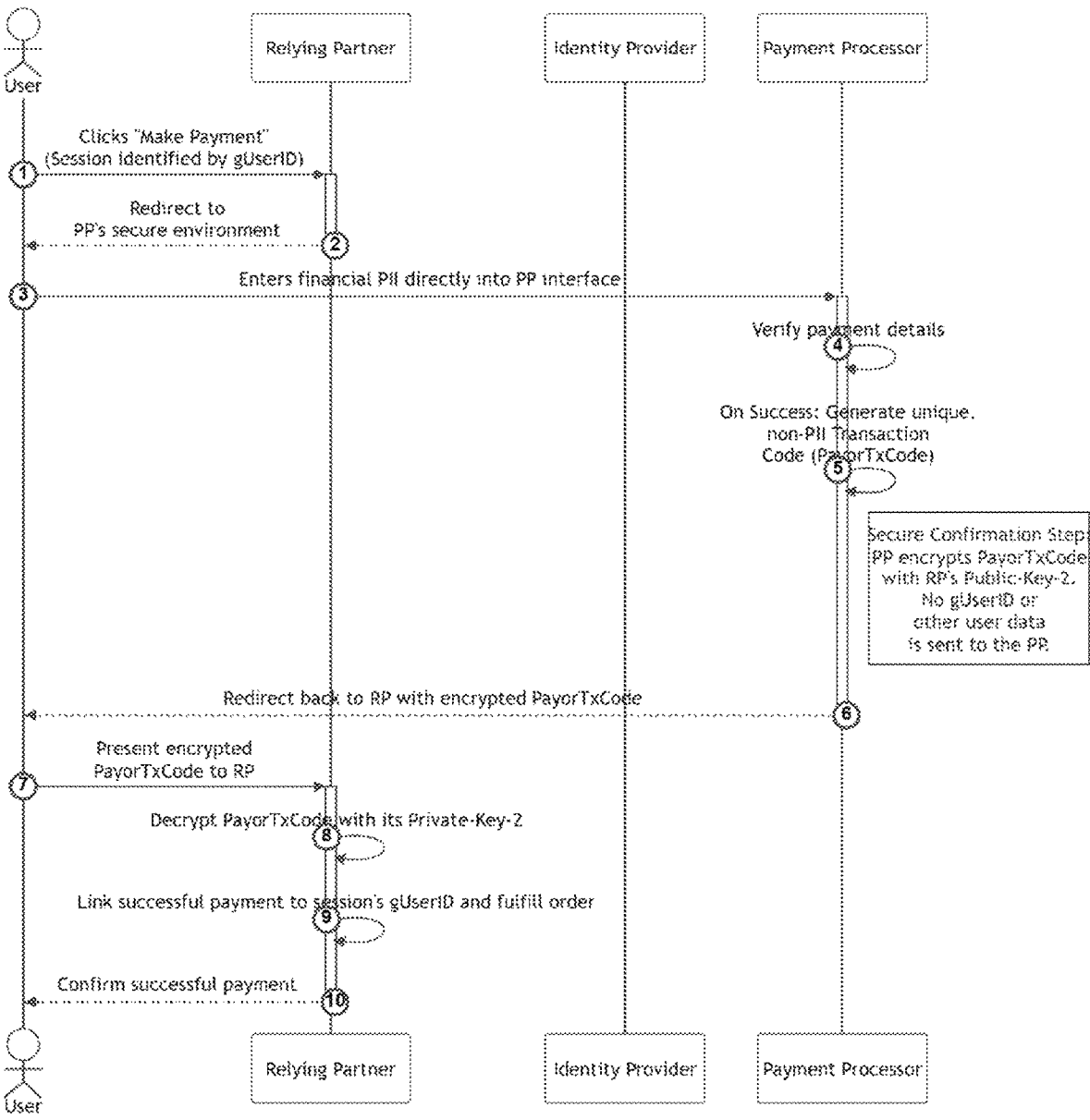
FIG. 7 is a sequence diagram illustrating the privacy-preserving payment flow for a user-initiated transaction.

Privacy-Preserving Financial Transactions (FIG. 7)

As recited in Claim 5, the framework provides a novel method for handling user-initiated financial transactions. As shown in FIG. 500, a user with an active session at the RP (identified by their gUserID) initiates a payment (step 1). The RP redirects the user to the independent PP (step 2). The user enters their financial PII directly into the PP's secure interface (step 3). Upon successful verification, the PP generates a unique, non-PII transaction code (PayorTxCode) (step 5). The PP then encrypts this PayorTxCode using the RP's public key and transmits only this encrypted code back to the RP (steps 6-8). The RP decrypts the code, and having secure, PII-free confirmation of payment, fulfills the order for the gUserID associated with the session (step 9).

Figure 4:
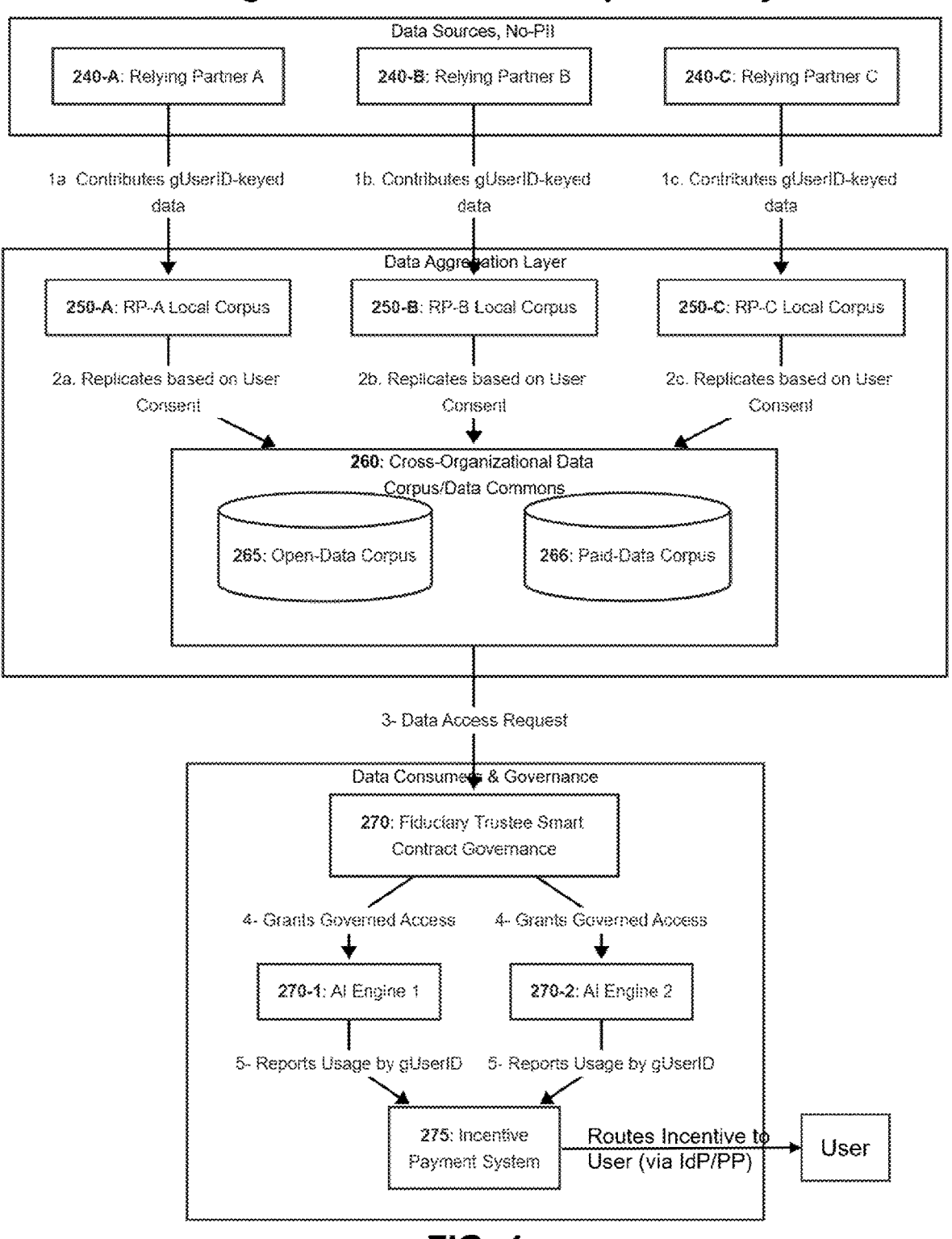
FIG. 4 is a block diagram illustrating the cross-organizational data corpus ecosystem, including the distinction between paid-data and open-data corpora.
Figure 11:
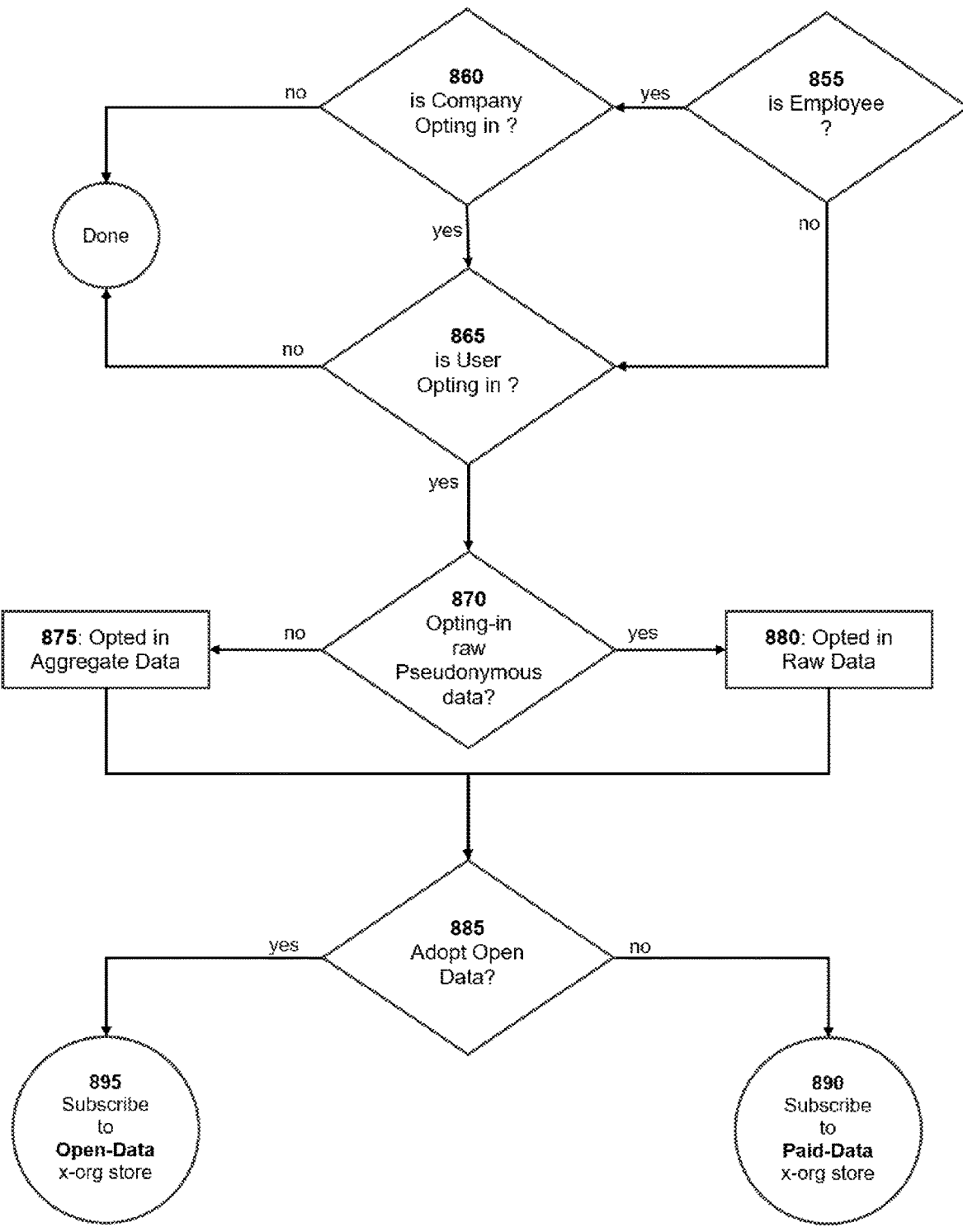
FIG. 11 is a flowchart illustrating the dynamic user consent process, including the granular choices for data contribution to different types of AI corpora FIG. 12 Identity Provider Pseudo-code shows handling authentication, generating gUserID, and how to neutralize the PII auth artifact.

Cross-Organizational Data Ecosystem (FIG. 4 and FIG.11)

The "no-PII framework" enables the creation of a powerful data ecosystem, as shown in FIG. 4. Multiple RPs (240-A, 240-B, 240-C) can contribute their gUserID-keyed data to their own local corpora (250-A, 250-B, 250-C).

As recited in Claims 8 through 11, users are given granular control over the contribution of their data. The user opt-in flow is detailed in FIG. 11. A user is presented with choices to opt-in (865), select the data granularity (raw vs. aggregate) (870, 875, 880), and, critically, choose the destination corpus (885). As recited in Claim 10, the user can choose to contribute their data to a Paid-Data Corpus (890) or a non-commercial Open-Data Corpus (895).

Referring back to FIG. 4, this user-consented data is replicated to the appropriate Cross-Organizational Data Corpus (265, 266). Access to this shared data is controlled by a Fiduciary Trustee/Smart Contract Governance layer (270), as recited in Claim 15. This governance layer programmatically enforces rules, such as a non-exclusivity clause to ensure the corpus remains a fair and open "data commons."

Figure 9:
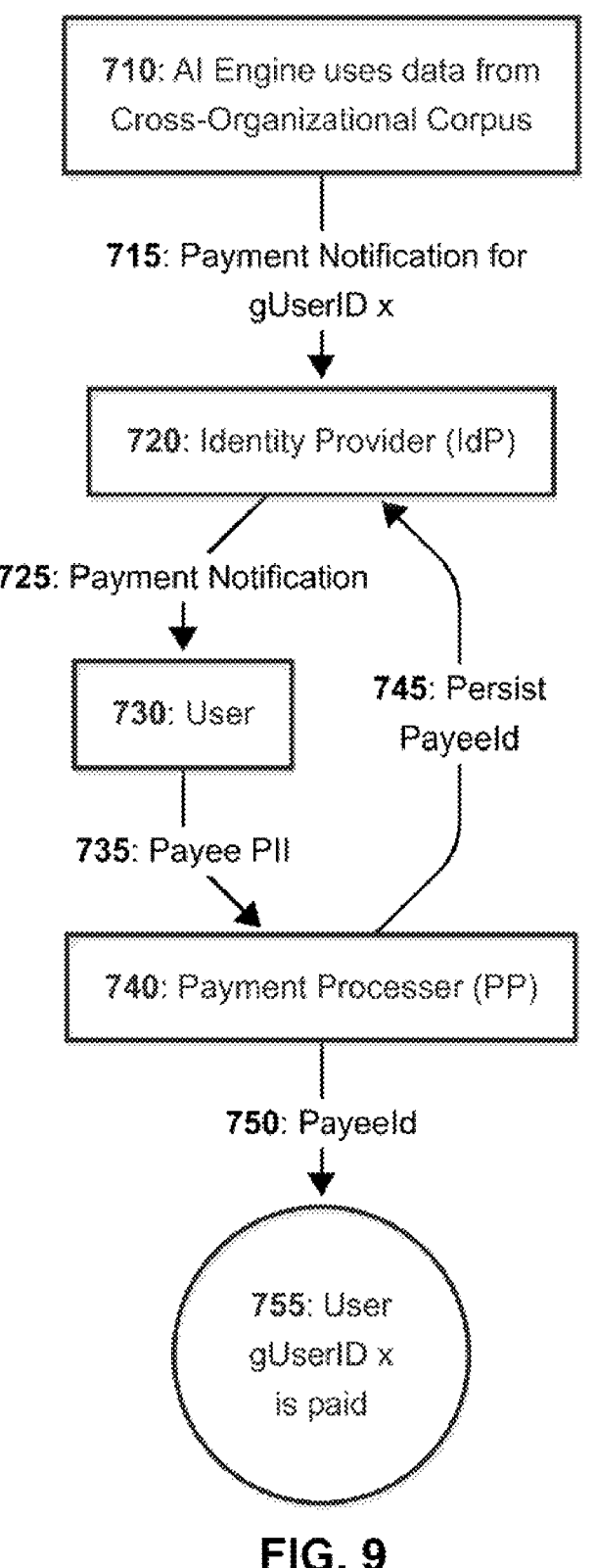
FIG. 9 is a flowchart illustrating the high-level privacy-preserving flow for an incentive payment made to a user.
Figure 10:
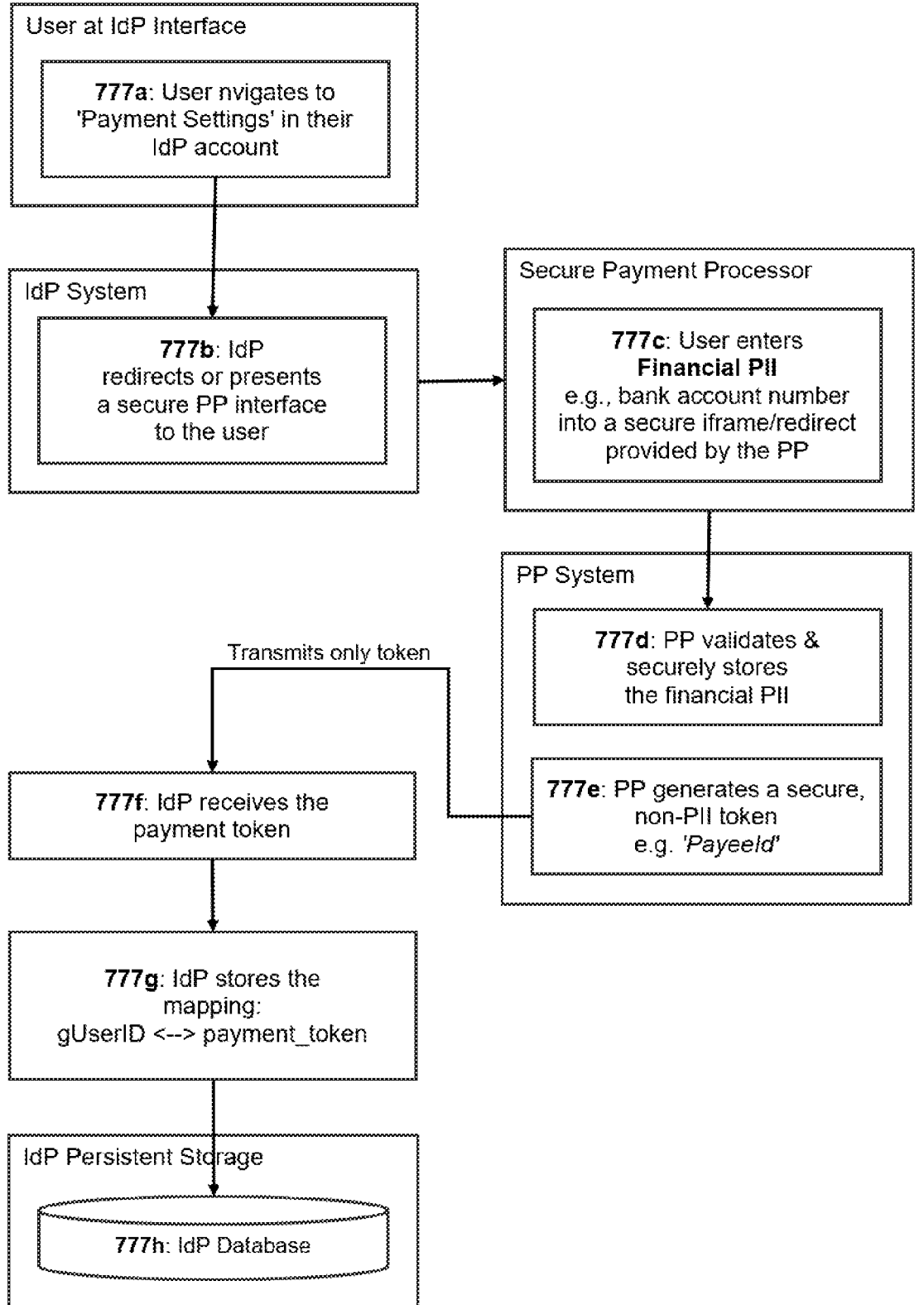
FIG. 10 is a flowchart illustrating the detailed one-time setup process for a user's incentive payment method, including the generation of a non-PII payment token.

Privacy-Preserving Incentive Payments (FIG. 9 and FIG. 10)

As recited in Claim 14, the system provides a novel method for rewarding users for contributions to the paid-data corpus. This requires a two-part process.

First, as shown in the one-time setup flow of FIG. 10, the user establishes their payment method. The user is directed from the IdP to the PP's secure environment (777a-c). The user enters their financial PII directly into the PP's system, which validates and stores it (777d). The PP then generates a secure, non-PII payment token (e.g., a PayeeId) (777e) and transmits only this token back to the IdP (777f). The IdP stores the mapping between the gUserID and this payment token (777g), ensuring the IdP itself never stores sensitive financial PII.

Second, as shown in the payment execution flow of FIG. 9, an AI Engine uses data from the corpus (710). An incentive payment system notifies the IdP to pay a certain amount to a specific gUserID (715). The IdP, using its stored mapping, then instructs the PP to execute the payment to the financial account associated with the corresponding payment token. This multi-step, token-based process ensures that the user can be compensated for their data without their financial PII ever being exposed to the data consumers or the IdP.

Embodiment with Passwordless Authentication

Figure 3:
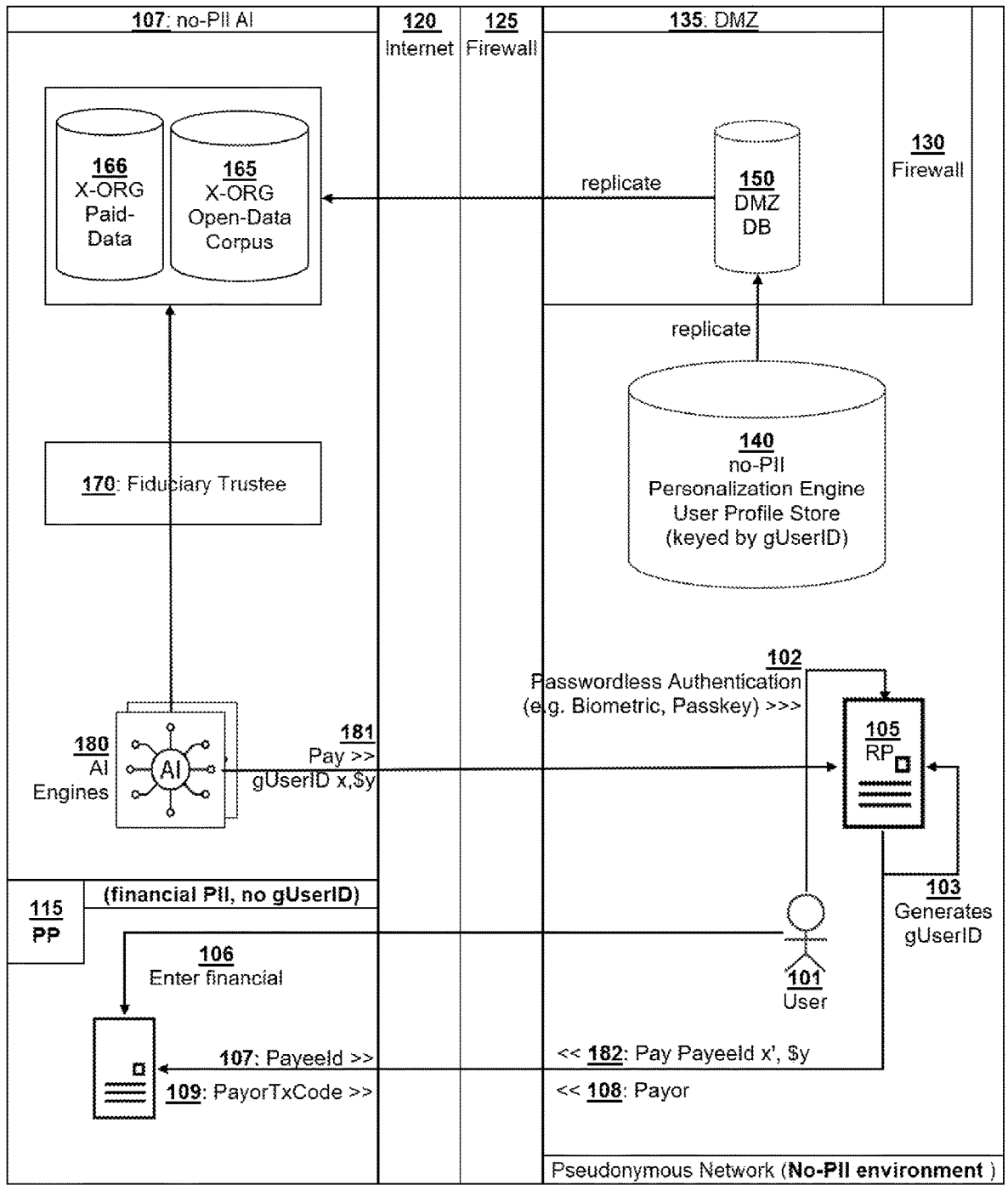
FIG. 3 is a block diagram illustrating the core system architecture of the passwordless no-PII framework.

Covered in FIG. 3, this is a simpler and more modern and secure embodiment as it reduces dependencies by removing the Identity Provider IdP (110) entirely. PP (115) is still a critical part of this embodiment architecture with the same features of being focused only on financial PII and no gUserID.

At the one-time registration of a device, the no-PII RP generates a gUserID without asking the new user for any kind of PII whatsoever. That's why it warns the user that the gUserID is irrecoverable if lost. The device also generates a cryptographic key pair and shares the public key with the service provider that uses it at login to verify the signature of a random string it sends to the device.

If the user chooses to share their data to an x-org paid-data corpus (166) expecting incentive payments from AI Engines (180), then the user is redirected to the PP (115) to enter their financial PII. The PP then generates a non-PII PayeeId key (107) which is then transmitted (181) to the RP (105). The RP securely stores a mapping between the user's gUserID and this received PayeeId. When an AI Engine (180) determines an incentive payment is due, it transmits a secure instruction (181) to the RP, the instruction comprising the user's gUserID and the payment amount. Using the stored mapping, the RP retrieves the corresponding PayeeId and transmits a payment instruction (182) to the PP, the instruction comprising the PayeeId and the payment amount. The settlement of funds between the AI Engine and the RP occurs via a pre-established financial arrangement, the specifics of which are outside the primary scope of the data segregation method. This architecture ensures the PP can execute the payment without ever knowing the gUserID, and the AI Engine can initiate the payment without ever knowing the PayeeId.

CONCLUSION, RAMIFICATIONS, AND SCOPE

Accordingly, the reader will see that the no-PII framework disclosed herein provides a specific and novel technical architecture that resolves the fundamental conflict between data utility and user privacy. The system's ability to support deep, persistent personalization within an architecturally enforced "no-PII" environment allows for the continued benefits of a tailored user experience while providing a verifiable guarantee that the user's real-world identity is protected. This encourages more active and honest user participation without fear of exploitation or judgment.

The ramifications of this architecture are significant. The creation of a persistent, globally unique, yet PII-free identifier (gUserID) enables, for the first time, the safe and ethical aggregation of longitudinal data across multiple, independent organizations. This unlocks the potential for creating vast, rich, and diverse data corpora that were previously impossible to assemble without severe privacy compromises. These cross-organizational data stores, whether structured as paid or open-data commons under the governance of a fiduciary trustee, have profound implications for advancing research in artificial intelligence, medicine, and social sciences by providing access to more powerful and representative datasets.

The passwordless embodiment maintains the benefits of the architecture of the first non-provisional application while enabling software platforms to independently adopt a modern more secure architecture without relying on an IdP. The role of the PP is still rather critical since it expands beyond normal financial transactions within a platform to also include handling AI Engine payments.

While the above description contains many specificities, these should not be construed as limiting the scope of the invention but as merely providing illustrations of some of the presently preferred embodiments. The scope of the invention should be determined by the appended claims and their legal equivalents, rather than by the examples given. For example, the specific cryptographic algorithms used, the method by which the orphaned "killer key" is provisioned (whether by self-destruction or via a Key Generation Oracle), and the specific implementation of the smart contract governance layer may vary. Furthermore, the framework is extensible to scenarios involving federated identities with multiple IdPs, or future authentication paradigms where the role of the IdP and RP might evolve. The core inventive concept remains the architectural segregation of PII and the use of a persistent, pseudonymous identifier to enable a new, privacy-preserving data ecosystem.

I claim:

1. A system for generating a privacy-preserving data corpus, the system comprising:
   a relying partner (RP) computing system comprising one or more processors and a memory; and
   a third-party identity provider (IdP) computing system, operated by a legal entity separate from an operator of the RP computing system, the third-party IdP computing system comprising one or more processors and a memory;
   wherein the third-party IdP computing system is configured to store or have access to a public key of a first cryptographic key pair for which a corresponding private key is permanently unavailable;
   wherein the third-party IdP computing system is further configured by instructions stored in its memory to, in response to receiving an authentication request for a user from the RP computing system:
      perform an authentication process that results in an authentication artifact containing personally identifiable information (PII) of the user;
      generate or retrieve a persistent, PII-free globally unique user identifier (gUserID) associated with the user, wherein the gUserID is configured to identify the user across a plurality of distinct RP computing systems;
      extract a stable, non-PII unique identifier from the authentication artifact;
      encrypt the authentication artifact containing the PII using the public key of the first cryptographic key pair, thereby rendering the PII therein permanently irrecoverable; and
      transmit only the gUserID to the RP computing system as a sole identifier for the user resulting from the authentication process;
   wherein the RP computing system is configured to:
      receive the gUserID from the third-party IdP computing system; and
      store user-generated data in the memory in association with the received gUserID.

2. The system of claim 1, wherein the third-party IdP computing system is further configured to:
   store, in the memory of the third-party IdP computing system, a mapping between the stable, non-PII unique identifier and the gUserID, wherein no other PII from the authentication artifact is stored in the memory of the third-party IdP computing system.

3. The system of claim 1, wherein the third-party IdP computing system is further configured to:
   generate a second cryptographic key pair comprising a public key and a private key, wherein the private key of the second cryptographic key pair is securely stored by the third-party IdP computing system; and
   prior to said transmitting the gUserID, digitally sign the gUserID using the private key of the second cryptographic key pair; and
   wherein the RP computing system is further configured to verify a digital signature of the gUserID using the public key of the second cryptographic key pair.

4. The system of claim 1, wherein the RP computing system further comprises a personalization engine configured to maintain a user profile associated with the gUserID, the user profile comprising user-generated data and interaction history providing a personalized user experience, wherein the user profile is stored without any PII of the user.

5. The system of claim 1, further comprising a third-party payment processor (PP) computing system, operated by a legal entity separate from the operator of the RP computing system and separate from an operator of the third-party IdP computing system, wherein the RP computing system is further configured to generate a third cryptographic key pair comprising a public key and a private key and to transmit the public key of the third cryptographic key pair to the third-party PP computing system; and wherein the third-party PP computing system is configured to:
   receive, from the RP computing system, a request to process a financial transaction for the user;
   receive financial PII from the user;
   upon successful verification of the financial PII, generate a non-PII transaction code;
   encrypt the non-PII transaction code using the public key of the third cryptographic key pair; and
   transmit only the encrypted non-PII transaction code to the RP computing system as confirmation of the financial transaction.

6. The system of claim 1, wherein the gUserID is a Universally Unique Identifier (UUID).

7. The system of claim 1, wherein the RP computing system is further configured to replicate at least a portion of the user-generated data from the memory of the RP computing system to a separate data corpus computing system.

8. The system of claim 7, wherein the replication of the at least a portion of the user-generated data is contingent upon receiving an opt-in selection from the user via a user interface.

9. The system of claim 8, wherein the opt-in selection comprises a user-selectable choice between contributing raw user-generated data or aggregated user-generated data to the separate data corpus computing system.

10. The system of claim 9, wherein the opt-in selection further comprises a user-selectable choice between contributing the user-generated data to a paid-data corpus or an open-data corpus.

11. The system of claim 10, wherein the opt-in selection further comprises a user-selectable time duration for the opt-in selection, and wherein the system is configured to programmatically enforce the time duration by automatically revoking access to the user-generated data upon expiration of the time duration.

12. The system of claim 7, wherein the data corpus computing system is a cross-organizational data corpus configured to store user-generated data associated with a plurality of gUserIDs received from a plurality of distinct RP computing systems.

13. The system of claim 12, further comprising an artificial intelligence (AI) engine computing system communicatively coupled to the cross-organizational data corpus, wherein the AI engine computing system is configured to train a machine learning model using the user-generated data stored within the cross-organizational data corpus.

14. The system of claim 13, further comprising a payment processing system and a third-party payment processor (PP) computing system, wherein the third-party IdP computing system is further configured to store a non-PII payment token associated with the gUserID, the non-PII payment token having been previously generated by the third-party PP computing system in response to receiving financial PII from the user; and wherein the payment processing system is configured to:

track usage of the user-generated data by the AI engine computing system on a per-gUserID basis;

calculate an incentive payment associated with the gUserID based on tracked usage; and instruct the third-party IdP computing system to facilitate transferring the incentive payment to the user;

wherein the third-party IdP computing system is further configured to, in response to the instruction, instruct the third-party PP computing system to execute a financial transaction to a financial account of the user corresponding to the non-PII payment token.

15. The system of claim 13, wherein the cross-organizational data corpus is structured as a data commons governed by a fiduciary trustee, and wherein the AI engine computing system is granted access to the cross-organizational data corpus only upon programmatic execution of a data use agreement comprising a non-exclusivity clause.

16. A computer-implemented method for enforcing segregation of personally identifiable information (PII) in a distributed data processing environment, the method comprising:

providing a third-party identity provider (IdP) computing system that stores or has access to a public key of a first cryptographic key pair for which a corresponding private key is permanently unavailable;

receiving, at the third-party IdP computing system, an authentication request for a user, the authentication request originating from a relying partner (RP) computing system that is operated by a legal entity separate from an operator of the third-party IdP computing system;

performing, by the third-party IdP computing system, an authentication process that generates an authentication artifact containing PII of the user;

generating or retrieving, by the third-party IdP computing system, a persistent, PII-free globally unique user identifier (gUserID) associated with the user, the gUserID being configured for use across multiple, distinct RP computing systems;

encrypting, by the third-party IdP computing system, the authentication artifact containing the PII with the public key of the first cryptographic key pair, wherein said encrypting renders the PII within the authentication artifact permanently irrecoverable;

transmitting, from the third-party IdP computing system to the RP computing system, the gUserID as a sole identifier for the user provided in response to the authentication request; and storing, by the RP computing system, user-generated data in association with the gUserID transmitted by the third-party IdP computing system.

17. The method of claim 16, further comprising:

prior to said encrypting the authentication artifact, extracting, by the third-party IdP computing system, a stable, non-PII unique identifier from the authentication artifact; and storing, by the third-party IdP computing system, a mapping between the extracted stable, non-PII unique identifier and the gUserID in a persistent memory of the third-party IdP computing system, wherein no other PII from the authentication artifact is stored in the persistent memory of the third-party IdP computing system.

18. The method of claim 16, further comprising:

generating, by the third-party IdP computing system, a second cryptographic key pair comprising a public key and a private key, and securely storing the private key of the second cryptographic key pair;

prior to said transmitting the gUserID, digitally signing, by the third-party IdP computing system, the gUserID using the private key of the second cryptographic key pair; and verifying, by the RP computing system, a digital signature of the gUserID using the public key of the second cryptographic key pair.

19. The method of claim 16, further comprising: maintaining, by the RP computing system, a user profile associated with the gUserID; and utilizing the user profile to provide a personalized user experience to the user, wherein the user profile is stored and utilized without any PII of the user.

20. The method of claim 16, further comprising:

receiving, at a third-party payment processor (PP) computing system, a request from the RP computing system to process a financial transaction for the user, wherein the third-party PP computing system is operated by a legal entity separate from an operator of the RP computing system;

receiving, at the third-party PP computing system, financial PII from the user;

generating, by the third-party PP computing system, a non-PII transaction code upon successful verification of the financial PII;

encrypting, by the third-party PP computing system, the non-PII transaction code using a public key of a cryptographic key pair previously provided by the RP computing system; and transmitting, from the third-party PP computing system to the RP computing system, only the encrypted non-PII transaction code as confirmation of the financial transaction.

21. The method of claim 16, wherein the gUserID is a Universally Unique Identifier (UUID).

22. The method of claim 16, further comprising replicating, by the RP computing system, at least a portion of the user-generated data to a separate data corpus.

23. The method of claim 22, wherein said replicating is performed only after receiving an opt-in consent from the user.

24. The method of claim 23, wherein receiving the opt-in consent comprises receiving a user selection to contribute one of raw user-generated data or aggregated user-generated data to the separate data corpus.

25. The method of claim 24, wherein receiving the opt-in consent further comprises receiving a user selection to contribute the user-generated data to one of a paid-data corpus or an open-data corpus.

26. The method of claim 25, wherein receiving the opt-in consent further comprises receiving a user-selectable time duration for the opt-in consent, and further comprising programmatically enforcing the time duration by automatically revoking access to the user-generated data upon expiration of the time duration.

27. The method of claim 22, wherein the separate data corpus is a cross-organizational data corpus that stores pseudonymous data contributed from a plurality of distinct RP computing systems, each portion of the pseudonymous data being associated with a gUserID.

28. The method of claim 27, further comprising training a machine learning model, by an artificial intelligence (AI) engine, using the pseudonymous data stored in the cross-organizational data corpus.

29. The method of claim 28, further comprising:
   providing the third-party payment processor (PP) computing system;
   receiving, at the third-party PP computing system, financial PII from the user and, in response, generating and transmitting a non-PII payment token to the third-party IdP computing system;
   storing, by the third-party IdP computing system, a mapping between the gUserID and the non-PII payment token;
   tracking, by a payment processing system, usage of the pseudonymous data by the AI engine on a per-gUserID basis;
   calculating an incentive payment associated with the gUserID based on the tracked usage; and
   instructing, by the third-party IdP computing system, the third-party PP computing system to execute a transfer of the incentive payment to a financial account of the user corresponding to the non-PII payment token.

30. The method of claim 28, wherein access to the cross-organizational data corpus by an AI engine is governed by a programmatic execution of a data use agreement comprising a non-exclusivity clause that applies to both a paid-data corpus and an open-data corpus.

31. A non-transitory computer-readable storage medium having stored thereon a data structure for training an artificial intelligence model, the data structure comprising:
   a plurality of data records, each data record comprising user-generated content obtained from one of a plurality of distinct relying partner (RP) computing systems, wherein each of the plurality of distinct RP computing systems is operated by a separate legal entity; and
   a plurality of persistent, personally identifiable information (PII)-free, globally unique user identifiers (gUserIDs), wherein each gUserID is associated with one or more of the plurality of data records;
   wherein the data structure is generated by a process comprising:
      for each distinct RP computing system of the plurality of distinct RP computing systems, receiving a gUserID from a third-party identity provider (IdP) computing system as a sole identifier for a user, the third-party IdP computing system having previously rendered PII associated with the user permanently irrecoverable by encrypting a PII-containing authentication artifact with a public key of a cryptographic key pair whose corresponding private key was permanently destroyed; and storing the user-generated content at that distinct RP computing system only in association with the received gUserID prior to contribution to the data structure.

32. The non-transitory computer-readable storage medium of claim 31, wherein each of the plurality of data records further comprises provenance metadata, the provenance metadata indicating at least an originating RP computing system and a timestamp of contribution.

33. The non-transitory computer-readable storage medium of claim 31, wherein the data structure is organized as a data commons, and wherein access to the data structure by an AI engine is controlled by a programmatic access-control mechanism.

34. The non-transitory computer-readable storage medium of claim 33, wherein the programmatic access-control mechanism is configured to grant access only upon successful execution of a smart contract that enforces a non-exclusive data use policy.

35. A system for generating a privacy-preserving data corpus, the system comprising:
   a relying partner (RP) computing system comprising one or more processors and a memory, wherein the RP computing system is configured to:
   initiate a passwordless authentication process directly with a client device of a user;
   receive, from the client device, a cryptographic confirmation of authentication that does not contain personally identifiable information (PII) of the user;
   in response to receiving the cryptographic confirmation, generate or retrieve a persistent, PII-free globally unique user identifier (gUserID) associated with the user; and
   store user-generated data in the memory in association with the gUserID, thereby establishing an authenticated session within a no-PII environment.

36. The system of claim 35, wherein the passwordless authentication process is compliant with a FIDO2 or WebAuthn standard.

37. The system of claim 35, wherein the RP computing system further comprises a personalization engine configured to maintain a user profile associated with a gUserID, the user profile comprising user-generated data and interaction history for providing a personalized user experience, wherein the user profile is stored without any PII of the user.

38. The system of claim 35, further comprising a third-party payment processor (PP) computing system, operated by a legal entity separate from an operator of the RP computing system, wherein the third-party PP computing system is architecturally constrained to be unaware of the gUserID.

39. The system of claim 38, wherein the RP computing system is further configured to:
   redirect the client device of the user to the third-party PP computing system to establish a payment method;
   receive, from the third-party PP computing system, a non-PII payment token generated by the third-party PP computing system in response to the user providing financial PII directly to the third-party PP computing system; and
   store, in the memory of the RP computing system, a mapping between the gUserID and the non-PII payment token.

40. The system of claim 39, further comprising an AI engine computing system communicatively coupled to the RP computing system, wherein the AI engine computing system is configured to instruct the RP computing system to initiate an incentive payment for a specific gUserID, and wherein the RP computing system is configured to, in response, instruct the third-party PP computing system to execute the incentive payment to a financial account corresponding to the non-PII payment token mapped to said gUserID.

41. The system of claim 35, wherein the RP computing system is further configured to replicate at least a portion of user-generated data from its memory to a separate data corpus computing system, wherein said replication is contingent upon receiving an opt-in selection from the user.

42. The system of claim 41, wherein the separate data corpus computing system is a cross-organizational data corpus configured to store user-generated data associated with a plurality of gUserIDs received from a plurality of distinct RP computing systems.

43. The system of claim 42, wherein the opt-in selection comprises a user-selectable choice between contributing user-generated data to a paid-data corpus or an open-data corpus.

44. The system of claim 42, wherein access to the separate cross-organizational data corpus by an AI engine is governed by a programmatic execution of a data use agreement comprising a non-exclusivity clause.

*     *     *     *     *

18